US007204762B2

(12) United States Patent
Campbell

(10) Patent No.: US 7,204,762 B2
(45) Date of Patent: Apr. 17, 2007

(54) SELF DAMPENING ROTARY SHAFT

(75) Inventor: Craig Andrew Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/808,741

(22) Filed: Mar. 24, 2004

(65) Prior Publication Data

US 2005/0215331 A1    Sep. 29, 2005

(51) Int. Cl.
*F16C 3/02*    (2006.01)
(52) U.S. Cl. .......................... 464/180; 442/12; 442/18
(58) Field of Classification Search ............... 464/127, 464/180, 181, 903, 183; 188/378; 428/34.2, 428/36.9; 442/6, 12, 18, 52, 53, 229, 295, 442/377; 138/141–146
See application file for complete search history.

(56) References Cited

U.S. PATENT DOCUMENTS

| | | | | |
|---|---|---|---|---|
| 2,748,830 A | * | 6/1956 | Nash et al. | 138/144 X |
| 2,751,765 A | * | 6/1956 | Rowland et al. | 464/180 |
| 4,059,712 A | * | 11/1977 | Bothwell | 428/34.6 |
| 4,135,553 A | * | 1/1979 | Evans et al. | 138/141 |
| 4,392,681 A | * | 7/1983 | Raquet | 188/378 X |
| 5,056,763 A | | 10/1991 | Hamada et al. | |
| 6,997,813 B2 | * | 2/2006 | Blumke et al. | 464/183 |
| 2005/0197194 A1 | * | 9/2005 | Haile et al. | 464/180 |

FOREIGN PATENT DOCUMENTS

| | | | | |
|---|---|---|---|---|
| GB | 1462170 | * | 1/1977 | 464/180 |
| JP | 63-163020 | * | 7/1988 | 464/181 |

OTHER PUBLICATIONS

Universal Joint and Driveshaft Design Manual, AE-7, The Society of Automotive Engineers, Inc., Warrendale, PA, pp. 235 & 263, TJ1079.S62 1979.*
Shigley et al, Mechanical Engineering Design, 4th ed., McGraw-Hill Inc., New York, pp. 436-438, 1983.*

* cited by examiner

*Primary Examiner*—Greg Binda
(74) *Attorney, Agent, or Firm*—Jennifer M. Brumbaugh; Mick A. Nylander

(57) ABSTRACT

A rotary shaft may include a multi-piece liner for absorbing vibrations caused by rotational energy generated by the rear axle and/or clutch of a motor vehicle.

15 Claims, 4 Drawing Sheets

SELF DAMPENING ROTARY SHAFT

TECHNICAL FIELD

The present invention relates to a liner for use with a rotary driveshaft. More particularly, this invention relates to a liner which is affixable to a rotary driveshaft for use on a conventional automotive vehicle to increase the resonance frequency of bending of the driveshaft and reduce undesirable vibrations.

BACKGROUND ART

There are generally four (4) main types of automotive power train ("driveline systems"). More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Driveline systems also include one or more constant velocity joints (CVJ's). Such joints, which include by way of example, and not limitation, the plunging tripod type and the high speed fixed type, are well known to those skilled in the art and are employed where transmission of a constant velocity rotary motion is desired or required. A typical driveline system for a rear wheel or all wheel drive vehicle, for example, incorporates one or more constant velocity joints to connect a pair of front and rear propeller shafts ("propshafts") to transfer torque from a power take off unit to a rear drive line module. Similarly, a drive line system for a front wheel drive vehicle incorporates one or more constant velocity joints to transfer torque from a power take off unit to a rotary drive shaft.

As those skilled in the art are aware, at certain rotational speeds and resonant frequencies, the above referenced propshafts and driveshafts (hereinafter collectively referred to as driveshafts), are known to exhibit unbalanced rotation and thus undesirable vibrations. These vibrations, in turn, are known to result in bending or torsional forces within and along the length of the respective driveshaft. It is obvious that such bending or torsional forces due to unbalanced rotation are neither desirable nor suitable in the operation of the drive train of most vehicles.

Dynamic dampers and mass dampers have heretofore been used to suppress undesirable vibrations that are induced in rotary driveshafts due to unbalanced rotation. Such dampers are often installed or inserted directly onto the rotary driveshafts. See, for example, U.S. Pat. No. 5,056,763 to Hamada, et al. As disclosed, the dynamic damper of Hamada, et al. comprises a pair of ring shaped fixing members spaced apart at predetermined intervals with a mass member disposed therebetween. A pair of connecting members are then provided to connect the ends of the fixing members to the ends of the mass member. In operation, the Hamada et al. damper transfers and absorbs the vibrational energy of the rotary drive shaft by generating a prescribed vibrational frequency adjusted to the dominant frequency of the vibrations. The dynamic damper thus cancels or negates vibrations that are induced onto or caused by the rotary driveshaft in normal operation of the drive train of the vehicle. As readily seen, however, the Hamada et al damper does not address, let alone increase, the threshold resonant frequency at which harmful bending of the driveshaft will occur in the first place.

As those skilled in the art will recognize, shorter length driveshafts have corresponding higher resonant frequencies of bending. Thus, current practice for increasing such resonant frequencies requires the use of multi-part (typically 3 pieces) drive shaft assemblies with respective shorter lengths. Such multi-piece assemblies, however, require greater expense to manufacture and greater labor and skill to install.

Consequently, a need exists for a rotary driveshaft which functions to not only negate undesirable vibrations caused by unbalanced rotation, but to increase the resonant frequency of bending of the driveshaft itself. There also is the need in the art for a driveshaft having fewer components and sections.

SUMMARY OF THE INVENTION

It is a principle object of the present invention to provide an improved driveshaft operative to inhibit rotational energy and related noise generated by an axle and/or clutch of a motor vehicle.

It is a further object of the present invention to provide an improved driveshaft having an increased threshold resonant frequency of bending.

It is a further object of the present invention to provide an improved driveshaft and/or driveshaft component which inhibits such rotational energy and noise and increases the resonant frequency of bending.

It is yet a further object of the present invention to provide a driveshaft with fewer sections.

In carrying out the above objects there is provided a driveshaft having internal self dampening/resonant frequency adjustment means which comprises, in a first preferred embodiment, a layer of ceramic deposited on the internal and/or external surfaces of the driveshaft. In a second preferred embodiment, an insert is provided which comprises a ceramic coated steel mesh affixed to a flexible, heat resistant material such as cardboard.

In each of the preferred embodiments, the internal self dampening/resonant frequency adjustment means may be applied to or inserted in a rear driveshaft section of a multi-piece driveshaft assembly. However, it is understood that the dampening means may be used in any or all of the driveshaft sections as well as any other rotary shaft where it may be desirable to absorb rotational energy as well as noise generated by an axle and/or clutch.

These and other objects features and advantages of the present invention will become more readily apparent with reference to the following detailed description of the invention wherein like reference numerals correspond to like components.

DESCRIPTION OF EMBODIMENT(S) AND BEST MODE FOR CARRYING OUT THE INVENTION

Figure 5:
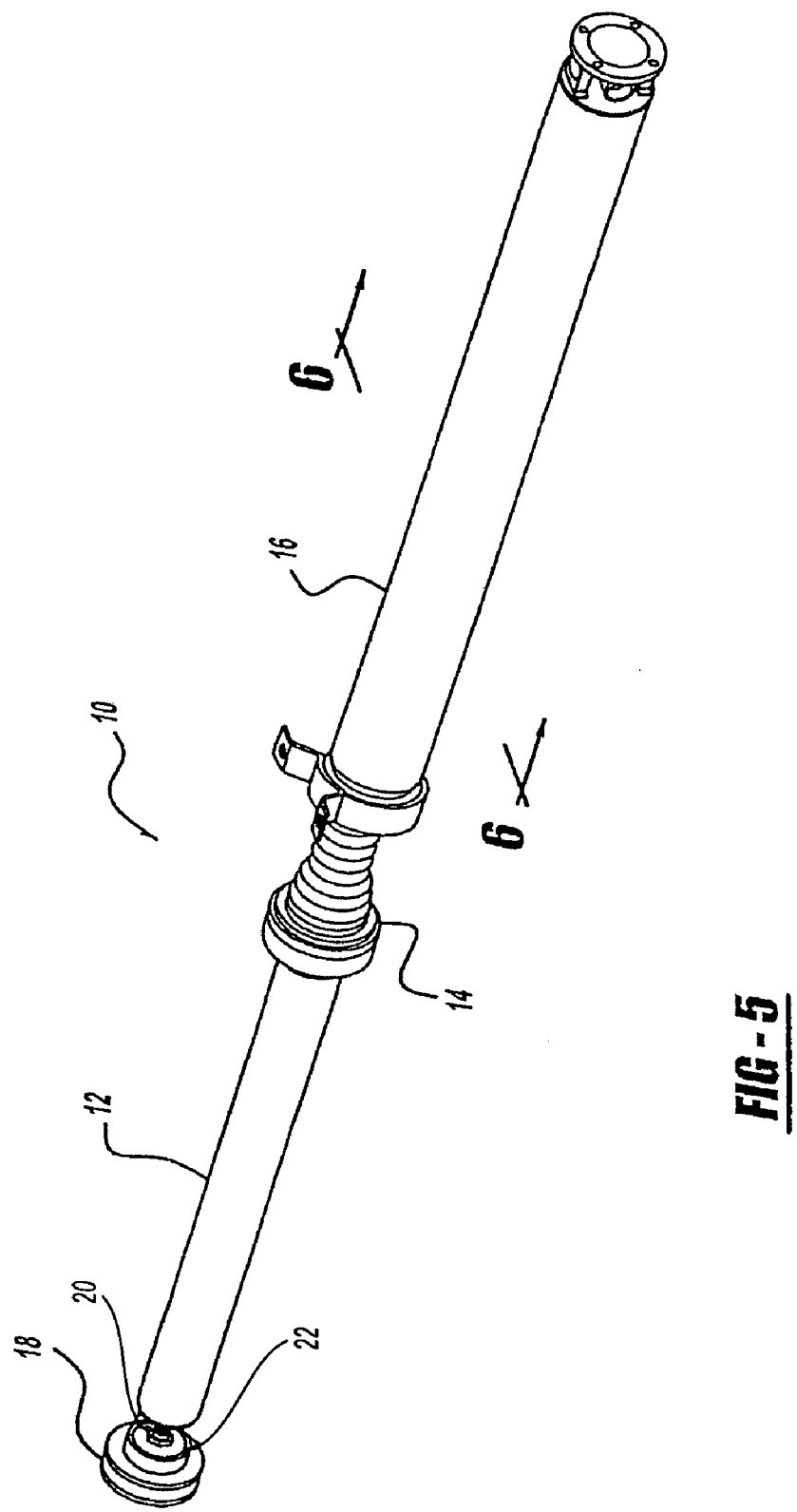
FIG. 5 is a perspective view of a representative driveshaft assembly incorporating the self-dampening means of the present invention.

Referring first to FIG. 5 there is shown generally by reference numeral 10, a representative driveshaft assembly of a motor vehicle. Assembly 10 comprises a front propeller shaft ("propshaft") 12 shown operatively connected to a constant velocity joint such as but not limited to a "VL" style plunging constant velocity joint 14. As those skilled in the art are aware, constant velocity joints are employed where transmission of a constant velocity rotary motion is desired or required. Plunging tripod joints in particular are currently used inboard (transmission side) in front wheel drive vehicles, and particularly in the propeller shafts found in rear wheel drive, all-wheel drive and 4-wheel drive vehicles. Plunging tripod universal joints allow the interconnection of shafts to change length during operation without the use of splines. The "VL" style plunging constant velocity joint 14 is therefore characterized by the performance of end motion in the joint with a minimum of frictional resistance, since part-spherical rollers are supported on corresponding arms by needle roller bearings. In a standard ball roller type constant velocity joint the intermediate member of the joint (like the ball cage in a Rzeppa constant velocity joint) is constrained to always lie in a plane which bisects the angle between the driving and driven shafts. Since the tripod type joint does not have such an intermediate member, the medium plane always lies perpendicular to the axis of the drive shaft.

Still referring to FIG. 5, connected to "VL" style plunging constant velocity joint 14 is rear propshaft assembly 16. Rear propshaft assembly 16 is further connected to a rear differential (not shown) and may include one or more intermediate components such as, for example, a Cardan joint assembly (not shown) and/or a speed sensing torque device (not shown).

A front propshaft assembly (not shown) is operatively connected to a high speed fixed joint 18. The high speed fixed joint (HSFJ) 18 is another type of constant velocity joint well known in the art and used where transmission of high speed is required. High speed fixed joints allow articulation to an angle (no plunge) but can accommodate much higher angles than with a Cardan joint or other non-CV joints.

In joints of this kind, the configuration of the tracks in the inner and outer joint members, and/or the internal and external surfaces of the cage are such that, when the joint is articulated, the common plane containing the centers of the balls substantially bisects the angle between the rotational axis of the joint members. There are several types of high speed fixed joints differing from one another with respect to the arrangement and configuration of the tracks in the joint members and/or to the internal and external surfaces of the cage whereby the common bisector plane is guided thereby giving the joint constant-velocity-ratio operating characteristics. In each design, however, the cage is located axially in the joint by cooperation between the external cage surface and the surfaces of the lands facing the cages surface.

High speed fixed joint 18 is connected at one end to a power take-off unit (not shown). In operation, the power take-off unit drives and thus transmits torque to front propshaft assembly 12 via the high speed fixed joint 18. The front propshaft 12 in the present invention is manufactured from steel providing a very low run-out and critical speed capacity higher than the second engine order. However, it should be noted that any other known metal, ceramic, plastic, etc., may also be used. Front propshaft 12 is operatively connected to constant velocity joint 18 by fasteners (not shown). Front propshaft 12 has a flange 20 extending out which is connected to constant velocity joint 18 by fasteners. High speed fixed joint 18 similarly includes a flange 22 extending out which is connected to front propshaft 12 by fasteners (not shown).

As indicated above, propeller shafts ("propshafts") 12 and 16 function to transfer torque to the rear axle in rear wheel and all wheel drive vehicles. These propshafts are typically rigid in the axial direction and under certain circumstances, can contribute to the transfer of force down the fore-to-aft axis of the vehicle on impact, particularly in a frontal crash. Such transfer of energy can lead to high forces in the vehicle and thus high rates of acceleration for the occupants. Further, such energy can contribute to uncontrolled buckling of the propshaft itself resulting in damage to the passenger compartment or fuel tank from puncturing or the like. Still further, such energy creates excessive and undesirable vibrations, i.e. noise, in the passenger compartment.

The present invention addresses and overcomes the aforementioned problems by providing an improved propeller shaft having self-dampening means for inhibiting undesirable noise caused by rotary motion of the rear axle and/or clutch of the motor vehicle.

Figure 1:
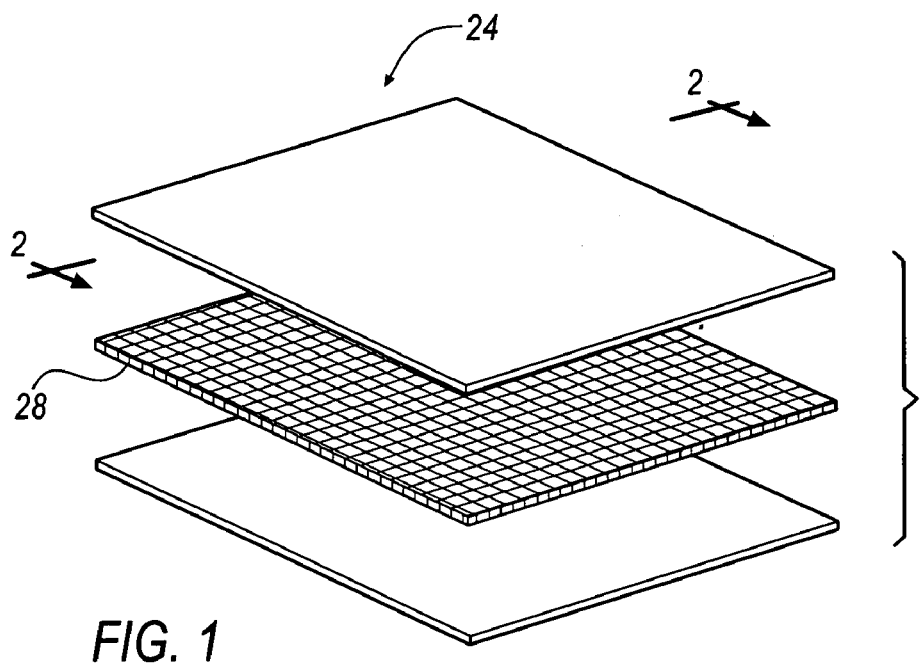
FIG. 1 is an exploded perspective view of a first embodiment of the self-dampening means of the present invention.
Figure 2:
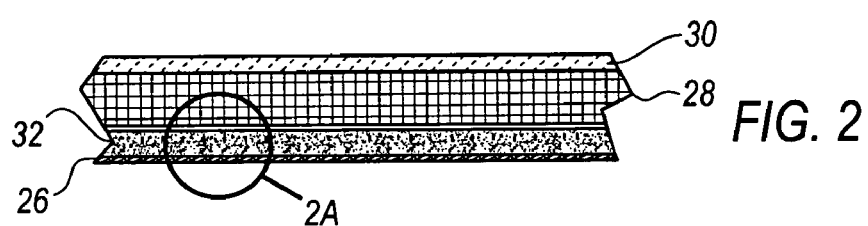
FIG. 2 is a cross sectional view of the first embodiment of the self-dampening means of the present invention taken along line 2—2 of FIG. 1.
Figure 2A:
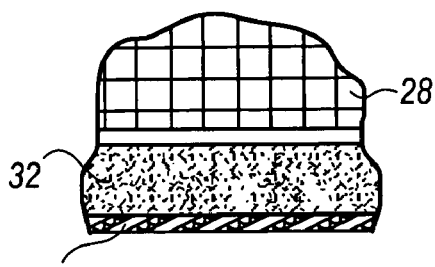
FIG. 2A is an enlarged view of area 2A of FIG. 2.
Figure 3:
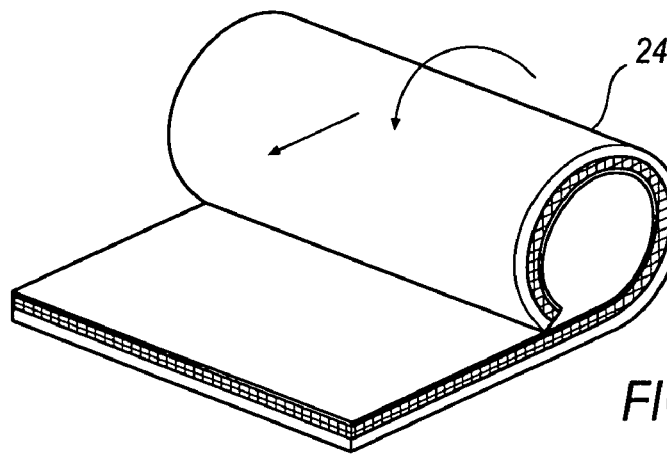
FIG. 3 is a perspective view of the self-dampening means of FIGS. 1 and 2 shown in a rolled position ready for insert into a drive shaft assembly.
Figure 4:
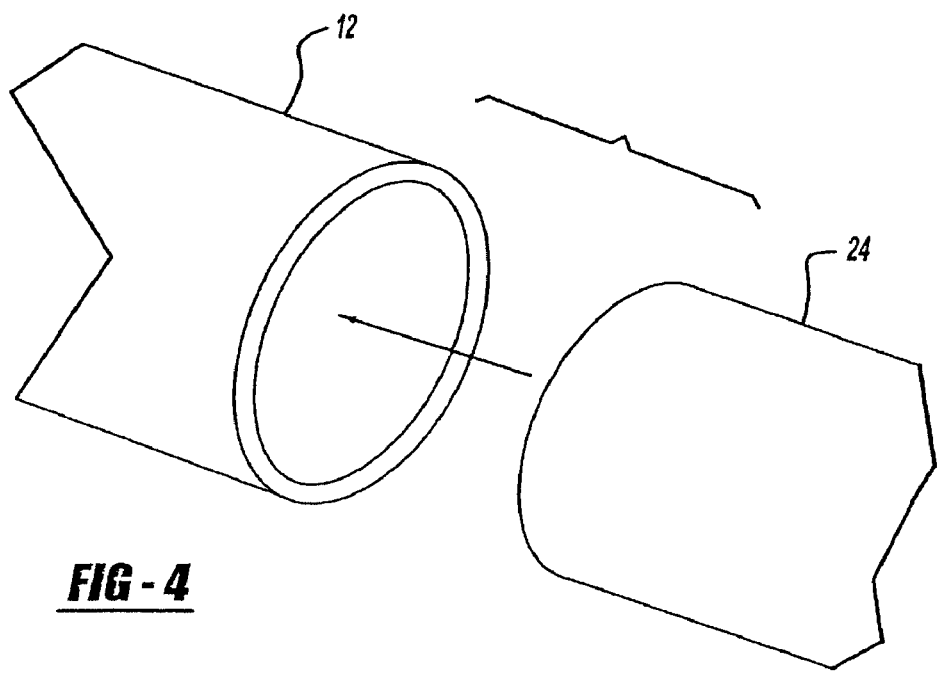
FIG. 4 is an exploded perspective view of a drive shaft shown receiving the self-dampening means of FIGS. 1–3.
Figure 6:
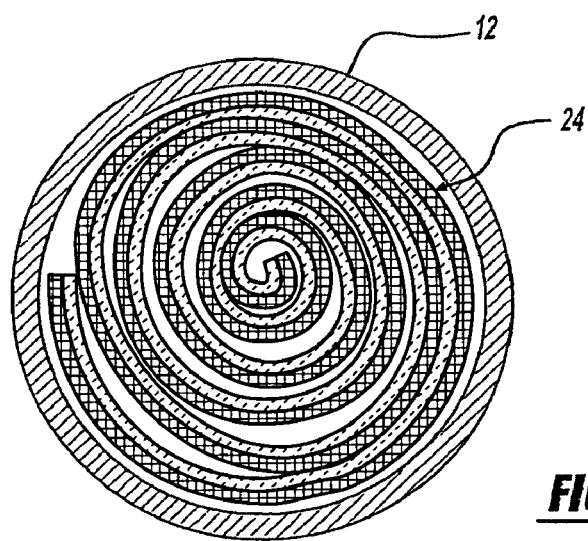
FIG. 6 is a cross sectional view of the driveshaft assembly of FIG. 5 taken along line 6—6.

Referring now to FIGS. 1–6, there is shown a first embodiment of the self dampening means of the present invention. As shown in FIG. 1, the self dampening means may comprise a multi-piece liner designated generally by reference numeral 24. Liner 24 includes a heat resistant layer 26 which may comprise, for example, a flexible material such as cardboard or the like. Liner 24 further includes a flexible substrate 28 which may comprise, for example, a steel wire mesh or any other suitable material adapted to receive and sustain a layer 30 of ceramic. In the preferred embodiment shown, ceramic layer 30 is conformally deposited by known techniques atop substrate 28. Such depositing operation may include, for example, chemical vapor deposition or any suitable means for achieving the desired result. Substrate 28 and ceramic layer 30 are then affixed to heat resistant layer 26 by any suitable means, including, without limitation, an adhesive 32 as shown in greater detail in FIG. 2. As shown in FIGS. 3–6, liner 24 may then be rolled and inserted within a desired driveshaft component such as front propshaft assembly 12. The liner 24 may be attached to an inside surface of the propshaft 12 by any known bonding technique. Alternatively, liner 24 may be removable from propshaft 12. This liner 24 will improve system packaging of the propshaft 72 and reduce noise, vibration, and harshness (NVH) concerns of the drive train system.

Figure 7:
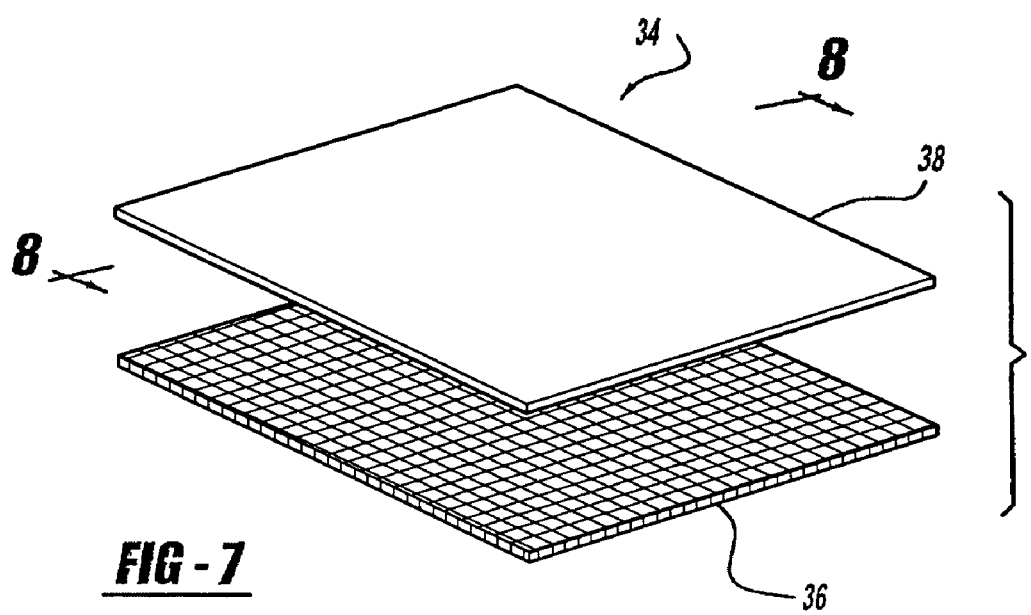
FIG. 7 is an exploded perspective view of a second embodiment of the self-dampening means of the present invention.
Figure 8:
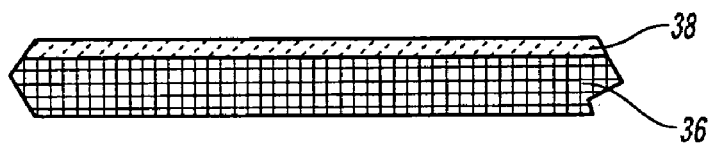
FIG. 8 is a cross sectional view of the second embodiment of the self-dampening means of the present invention taken along line 8—8 of FIG. 7.

Turning now to FIGS. 7–8 there is shown an alternative embodiment of the self-dampening means of the present invention illustrated as an internal or external layer of the driveshaft component such as front propshaft 12. In this embodiment, liner 34 similarly includes a steel wire mesh or other suitable substrate 36 adapted to receive a ceramic layer 38. However, in contrast to the first embodiment discussed above, liner 34 may be applied directly to the internal or external surface of a desired driveshaft at the time of manufacture in addition to or in place of a dampening insert. The liner 34 will be bonded to the surface of the propshaft 12 by any known chemical or mechanical bonding techniques. The propshafts are generally steel however any other metal such as but not limited to aluminum, etc., may be used as long as the material can have a ceramic and/or any other material with a high Young's modulus, bonded to it. It should also be noted that the ceramic 38 may be installed in propshaft 12 in a wet mode or applied in the form of a sticker like application, etc., along with other known and contemplated attaching or bonding techniques and methods.

As indicated above, the layer adapted to receive the ceramic coating, i.e. substrate 28 or 36 typically, but not necessarily, comprises a steel wire mesh, and may be a stainless steel wire mesh. The wire mesh 36 will reinforce the ceramic layer 38 and increase the durability of the dampening means. It is understood, however, that any suitable material (metal, plastic, rubber, ceramic, metal alloys, and combinations thereof, etc.) may be used having any suitable configuration (mesh, not mesh, etc.) depending only on the application and the desired result. Further, while shown incorporated herein as part of a front propshaft 12, it is contemplated that liner 24 and/or 38 of the present invention, and variations thereof, may be used in other driveshaft assemblies and parts and components thereof, including, without limitation, propeller shaft assemblies, halfshaft assemblies, etc.

It should be noted that any of the embodiments contemplated or disclosed herein may cover or extend the entire propshaft or predetermined sections of the propshaft tube depending on the design requirements of the drive train system and type of propshaft used therein. The use of the dynamically stiff ceramic insert will increase the resonant frequency for first bending by approximately 35%.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A rotary shaft for use in the drive line of a motor vehicle, the shaft comprising:
   a liner, including a cardboard layer and a ceramic layer, wherein the liner is selectively coupled to a portion of the shaft to absorb vibration energy of the rotary shaft and increase the resonant frequency of bending of the shaft, wherein the liner farther comprises a substrate comprising a wire mesh, wherein the ceramic layer is deposited atop the substrate.

2. A rotary shaft as in claim 1, wherein the liner is removable from the shaft.

3. A rotary shaft as in claim 1, wherein the liner is attached to an inside surface of the shaft.

4. A rotary shaft as in claim 1, wherein the cardboard layer is a heat resistant layer.

5. A rotary shaft as in claim 1, wherein the wire mesh is comprised of stainless steel.

6. A rotary shaft as in claim 1, wherein the liner increases the resonant frequency of bending of the shaft by about 350%.

7. A shaft for use in a motor vehicle comprising;
   a tube section; and
   a liner having a heat resistant layer that comprises cardboard,
   wherein the liner further comprises a substrate comprising a wire mesh, and wherein the substrate is at least partially coated with ceramic;
   wherein said liner is coupled to a surface of said tube section, said liner increases the resonant frequency of the shaft.

8. The shaft of claim 7, wherein said liner is bonded to an inside surface of said tube section.

9. The shaft of claim 8, wherein said liner is arranged along the entire length of said tube section.

10. The shaft of claim 7, wherein said liner is attached to a predetermined section of said tube section.

11. The shaft of claim 7, wherein said substrate is a stainless steel mesh.

12. The shaft of claim 7, wherein said liner increases said resonant frequency by approximately 35%.

13. The shaft of claim 7, wherein said liner is removable.

14. The shaft of claim 7, wherein said tube section is made of steel or aluminum.

15. A shaft for use in a motor vehicle comprising;
   a tube section; and
   a liner having a heat resistant layer and a substrate, wherein the substrate is at least partially coated with ceramic;
   wherein the heat resistant layer is comprised of cardboard,
   wherein the substrate further comprises a stainless steel wire mesh, and wherein the liner is bonded to an inside surface of said tube section, said liner increases the resonant frequency of the shaft.

* * * * *

UNITED STATES PATENT AND TRADEMARK OFFICE
CERTIFICATE OF CORRECTION

PATENT NO. : 7,204,762 B2  Page 1 of 1
APPLICATION NO. : 10/808741
DATED : April 17, 2007
INVENTOR(S) : Craig Andrew Campbell It is certified that error appears in the above-identified patent and that said Letters Patent is hereby corrected as shown below:

Column 6, line 18 in claim 6, "350%" should read --35%--

Signed and Sealed this

Fifth Day of June, 2007

JON W. DUDAS
*Director of the United States Patent and Trademark Office*